(12) United States Patent
Conti et al.

(10) Patent No.: US 7,070,026 B2
(45) Date of Patent: Jul. 4, 2006

(54) BRAKE ACTUATOR APPARATUS AND METHOD FOR ACTUATING A BRAKE

(75) Inventors: Roberto Conti, Olgate (IT); Denis John McCann, Rochester Hills, MI (US); Paul Anthony Thomas, Caldicot (GB); Franz Helmut Holl, Masterhausen, Rheinland-Realz (DE); Wilfried Giering, Mendig (DE); Markus Necknig, Waldesch (DE); Dietmar Knoop, Mulheim-Karlich (DE); Andrew John Ward, Northampton (GB)

(73) Assignee: ArvinMeritor Heavy Vehicle Braking Systems (UK) Ltd., Berks (GB)

( * ) Notice: Subject to any disclaimer, the term of this patent is extended or adjusted under 35 U.S.C. 154(b) by 0 days.

(21) Appl. No.: 10/475,754

(22) PCT Filed: Mar. 27, 2001

(86) PCT No.: PCT/GB02/01463
§ 371 (c)(1),
(2), (4) Date: Apr. 21, 2004

(87) PCT Pub. No.: WO02/088561
PCT Pub. Date: Nov. 7, 2002

(65) Prior Publication Data
US 2005/0006949 A1 Jan. 13, 2005

(30) Foreign Application Priority Data
Apr. 27, 2001 (GB) .................................... 0110438

(51) Int. Cl.
*F16F 9/32* (2006.01)

(52) U.S. Cl. .................. 188/266.7; 188/72.3; 188/72.8
(58) Field of Classification Search ............... 188/72.1, 188/72.3, 72.7, 72.8, 73.1, 71.9, 266, 266.7
See application file for complete search history.

(56) References Cited

U.S. PATENT DOCUMENTS

| 4,623,044 A | 11/1986 | Ohta et al. |
| 4,765,140 A | 8/1988 | Imoto et al. |
| 5,090,518 A | 2/1992 | Schenk et al. |
| 5,333,455 A * | 8/1994 | Yoshioka ..................... 60/533 |
| 6,691,837 B1 * | 2/2004 | Kapaan et al. ............. 188/72.1 |
| 2004/0251092 A1 * | 12/2004 | Kramer et al. ............. 188/72.1 |

FOREIGN PATENT DOCUMENTS

| DE | 195 08 253 | 9/1996 |
| JP | 2171371 A * | 7/1990 |

OTHER PUBLICATIONS

Printout of patent 5090518 to Schenk et al. (actual Patent Image was not available).*

* cited by examiner

*Primary Examiner*—Melody M. Burch
(74) *Attorney, Agent, or Firm*—Carlson, Gaskey & Olds

(57) ABSTRACT

A brake actuating apparatus includes a force transmission element operable to transmit a brake actuating force and an abutment member moveable to abut the force transmission element. A piezo-electric device operable on expansion applies a force between the abutment member and the force transmission element to move the force transmission element in a direction of brake actuation. A support member moveable independently of the abutment member supports the force transmission element in the new position following expansion of the piezo-electric device.

9 Claims, 3 Drawing Sheets

BRAKE ACTUATOR APPARATUS AND METHOD FOR ACTUATING A BRAKE

This application claims priority to PCT application PCT/GB02/01463 filed on Mar. 27, 2002, which claims priority to Great Britain patent application GB0110438.9 filed Apr. 27, 2001.

TECHNICAL FIELD

The present invention relates to a brake actuator apparatus and method for actuating a brake.

BACKGROUND OF THE INVENTION

A known vehicle braking system includes a disc fixed for rotation with a wheel and a brake clamping mechanism including a tappet mechanically actuated to bring brake pads into contact with the disc and to apply a force between the pads and the disc to provide frictional braking.

Piezo-electric devices, which expand when energized by an electric voltage, are known for applying a mechanical actuating force over a short distance.

SUMMARY OF THE INVENTION

The brake actuating apparatus of the present invention includes a force transmission element operable to transmit a brake actuating force and an abutment member moveable to abut the force transmission element. A piezo-electric device operable on expansion applies a force between the abutment member and the force transmission element to move the force transmission element in a direction of brake actuation. A support member is moveable independently of the abutment member to support the force transmission element in its new position following expansion of the piezo-electric device.

Preferably, the piezo-electric device is fixed for movement with the first abutment member. Alternately, the piezo-electric device may be fixed for movement with the force transmission element.

Preferably, the apparatus further includes a body member. The abutment member has a threaded portion in threaded engagement with the body member to be moveable by relative rotation between the abutment member and the body member.

Preferably, the support member includes a threaded portion in threaded engagement with a second body member of the apparatus and is axially moveable by relative rotation between the support member and the second body member.

The abutment member and support member are rotatable by respective rotation devices. Alternately, the body member and the second body member are rotatable by respective rotation devices. Preferably, the rotation devices are electric motors.

For releasing the brake, the support device is arranged to support the force transmission element for movement of the abutment member, with the piezo-electric device contracted, to a position wherein expansion of the piezo-electric device causes the abutment member to abut the force transmission element. The support member is moveable to a position wherein contraction of the piezo-electric device allows the force transmission element to move into abutment with the support member.

A method for actuating a brake includes moving an abutment member into abutment with a force transmission element operable for transmitting a brake actuating force. A piezo-electric device expands to apply a force between the abutment member and the force transmission member to move the force transmission element in a direction of brake actuation. A support member is moved into abutment with the force transmission element to support the force transmission element in its new position, and the piezo-electric device is contracted. These steps are repeated as many times as required to actuate the brake. When the brake is to be released, the force transmission element is supported by the support member and the piezo-electric device contracts, moving the abutment member out of abutment with the force transmission element. The piezo-electric device is expanded, and causing the abutment member to abut the force transmission element. The support member is moved away from the force transmission element, contracting the piezo-electric device, causing the support member to support the force transmission element. These steps are repeated as many times as required to release the brake.

Although the distance the piezo-electric device moves is small, by repeatedly expanding and contracting the device and moving the abutment member and support member to abut the force transmission element, the piezo-electric device may be used to provide a substantially larger movement to the force transmission element.

A braking mechanism has a degree of elasticity in its structure, and a degree of elastic deformation has to be taken up by the structure before the force applied by the actuating device is transmitted to the brake pads. The piezo-electric device may be used to move the force transmission element beyond the elastic deformation of the structure and to apply the braking force.

A further advantage is that the same apparatus may also be used to release the brake.

BRIEF DESCRIPTION OF THE DRAWINGS

An embodiment of the invention will now be described by way of example, with reference to the accompanying drawings in which.

DETAILED DESCRIPTION OF A PREFERRED EMBODIMENT

Figure 1A:
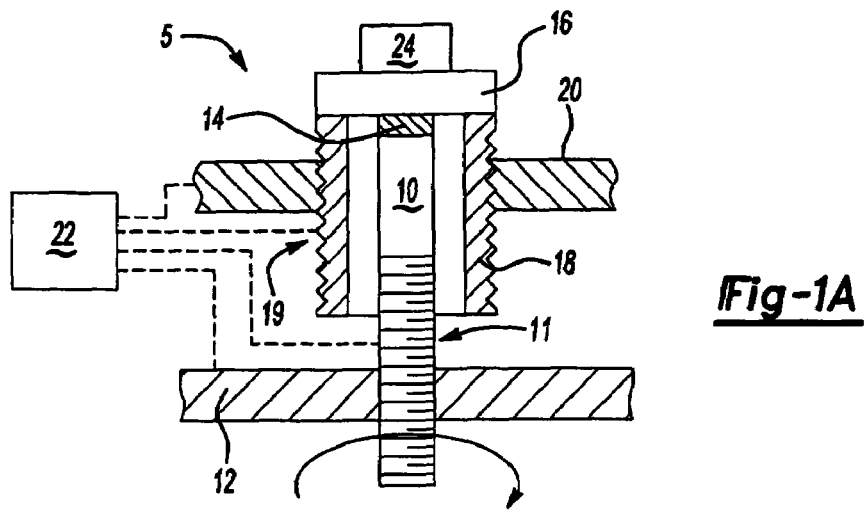
FIGS. 1a to 1e show the stages in the operation of a brake actuator that applies an actuating force.

FIG. 1a shows an actuator 5 for actuating a brake 24 including an abutment member in the form of a pin 10 arranged on an axis of the actuator 5. The pin 10 has a threaded portion 11 in threaded engagement with an associated first body member 12 of a vehicle brake mechanism. The first body member 12 is axially fixed with respect to the brake mechanism. A piezo-electric device 14 including at least one piezo-electric element is fixed to the pin 10 and is expandable by application of an electric voltage. The pin 10 abuts a force transmission element in the form of a tappet 16 for transmitting an applied actuating force in an axial direction. The tappet 16 forms part of a clamping mechanism for exerting a clamping force on a pair of brake pads in response to application of the brake 24.

A support member in the form of a sleeve 18 has a threaded portion 19 in threaded engagement with an associated second body member 20 of the brake mechanism. The second body member 20 is axially fixed with respect to the brake mechanism. The sleeve 18 is substantially coaxial with and surrounds the pin 10. The sleeve 18 abuts the tappet 16 to support it.

The engagement of the threaded portions 11 and 19 of the pin 10 and the sleeve 18, respectively, provide axial movement by relative rotation between the pin 10 and the sleeve 18 and their respective associated body members 12 and 20. Rotational motion is provided to the pin 10 or the sleeve 18 by associated electric motors 22. Alternately, rotational motion may be provided to the first and second body members 12 and 20, respectively.

The piezo-electric device 14 does not have to directly abut the tappet 16 (as shown in FIGS. 1a to 1e and 2a to 2e), but may be situated at any position along the length of the pin 10 so that expansion of the piezo-electric device 14 causes the pin 10 to abut the tappet 16 and to apply a force in the axial direction. Alternately, the piezo-electric device 14 can be attached to the tappet 16.

Figure 1B:
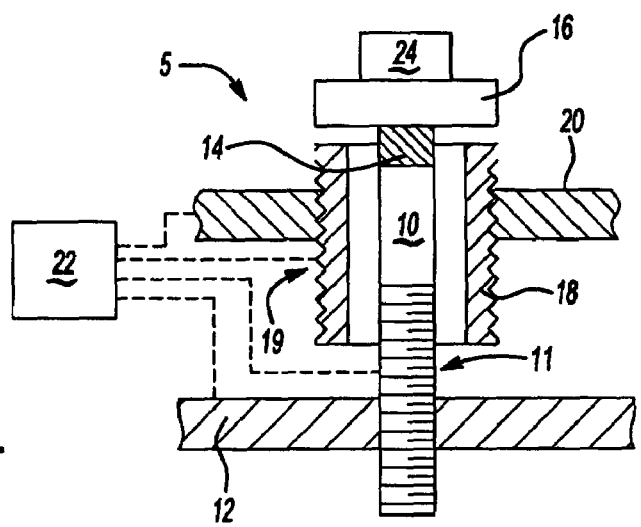

Referring to FIG. 1b, in the first stage of actuation of the brake 24, the piezo-electric device 14 is expanded by application of the electric voltage to apply a force to the tappet 16 and move the tappet 16 in the axial direction out of contact with the sleeve 18.

Figure 1C:
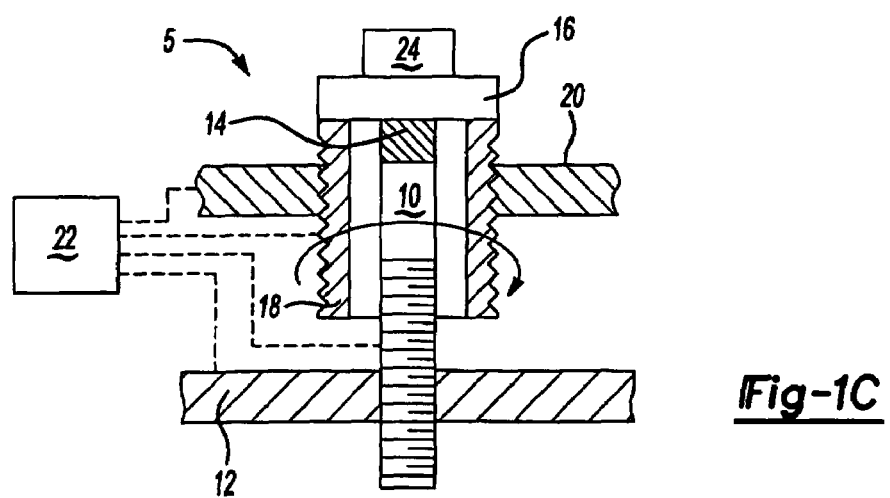

In the second stage, as shown in FIG. 1c, the sleeve 18 is rotated to move axially to abut the tappet 16.

Figure 1D:
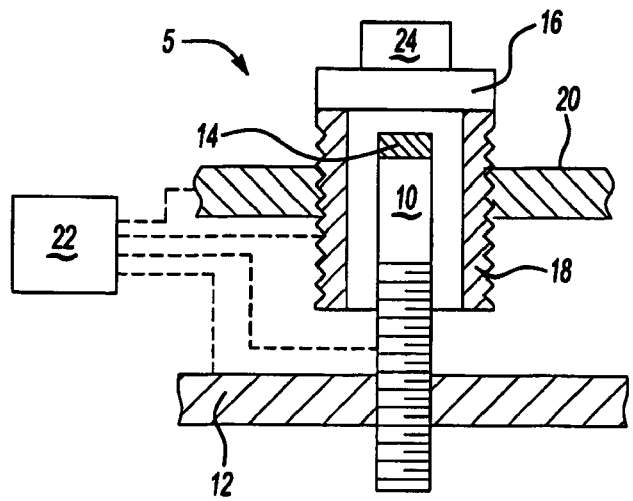

In the third stage, as shown in FIG. 1d, the piezo-electric device 14 is contracted by removal of the electric voltage, moving the pin 10 out of contact with the tappet 16.

Figure 1E:
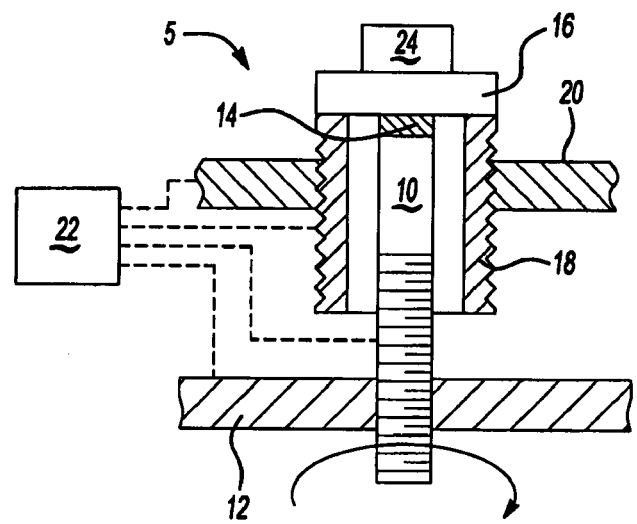

In the fourth stage, as shown in FIG. 1e, the pin 10 is rotated to move axially to abut the tappet 16. The actuator 5 is in the same configuration as in FIG. 1a, although the tappet 16, the pin 10, and the sleeve 18 have been moved in the axial direction.

The stages shown in FIGS. 1a to 1e are repeated as many times as required to take up the elastic deformation of the brake mechanism and to apply the required braking force to the brake 24.

Although only a small movement of the tappet 16 can be affected by a single expansion of the piezo-electric device 14, the brake 24 can be actuated by repeated expansion and contraction of the piezo-electric device 14.

Figure 2A:
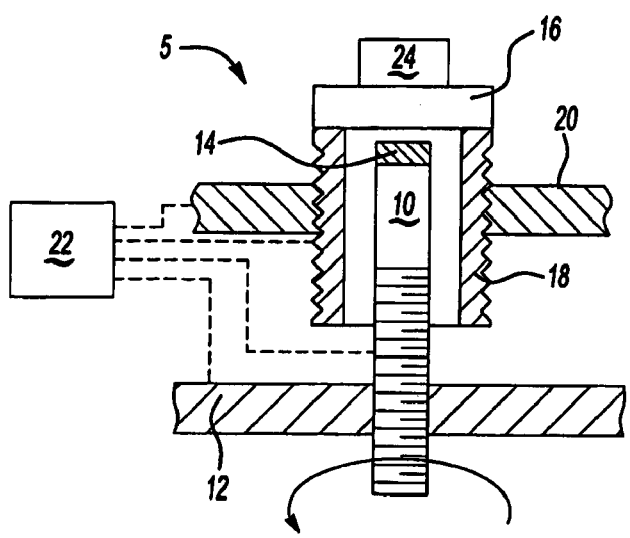
FIGS. 2a to 2d show the stages in the operation of the actuator of FIGS. 1a to 1e for releasing the brake.

Referring to FIG. 2a, in the first stage of releasing the brake 24, the pin 10 is rotated to move a first predetermined distance axially away from the tappet 16.

Figure 2B:
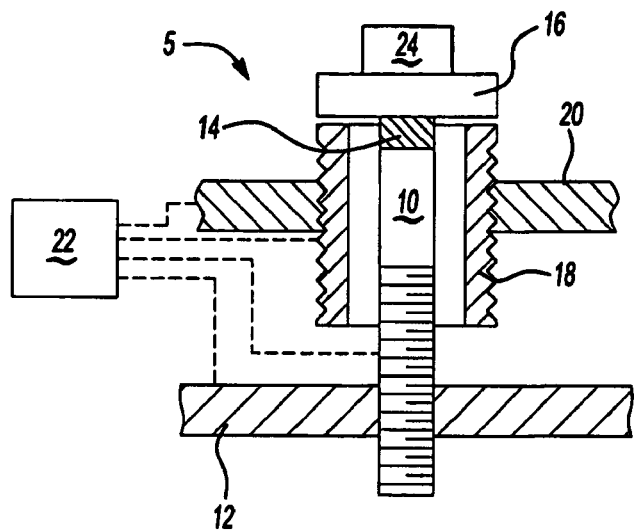

The first predetermined distance is set such that in the second stage, as shown in FIG. 2b, the piezo-electric device 14 is expanded to abut the tappet 16 and move the tappet 16 just clear of the sleeve 18.

Figure 2C:
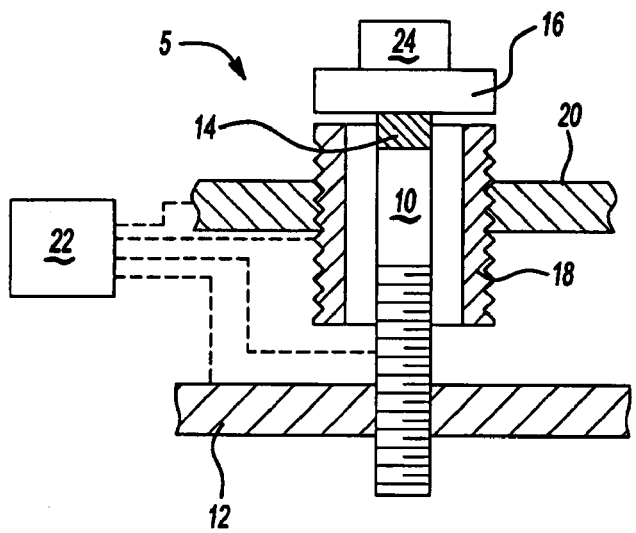

In the third stage, shown in FIG. 2c, the sleeve 18 is rotated to move a second predetermined distance axially away from the tappet 16.

Figure 2D:
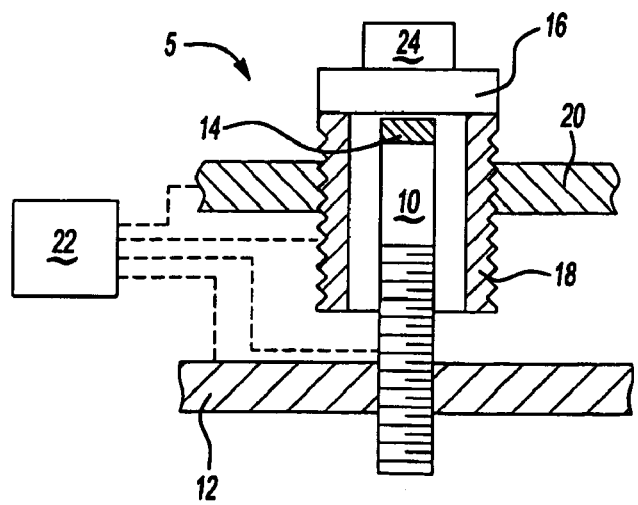

The second predetermined distance is set such that in the fourth stage, as shown in FIG. 2d, the sleeve 18 is in a position such that, when the piezo-electric device 14 is contracted, the tappet 16 moves axially to just abut the sleeve 18 before the piezo-electric device 14 has fully contracted.

The stages shown in FIGS. 2a and 2d are repeated to further release the brake 24.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A brake actuating apparatus comprising:
   a force transmission element positioned at a first position that transmits a brake actuating force;
   an abutment member that is moveable to cause a piezo-electric device to selectively abut and disengage from the force transmission element;
   the piezo-electric device being expandable to apply a force between the abutment member and the force transmission element to move the force transmission element in a direction of brake actuation; and
   a support member moveable independently of the abutment member to support the force transmission element stationary in a new position following movement of the force transmission element from the first position by expansion of the piezo-electric device and to allow the abutment member to move the piezo-electric device so that the piezo-electric device is expandable to apply the force between the abutment member and the force transmission element to move the force transmission element from the new position in the direction of brake actuation, wherein the support member and the abutment member are co-axially arranged,
   wherein the abutment member includes a first threaded portion in threaded engagement with a first body member and the abutment member is moveable by relative rotation between the abutment member and the first body member, and
   wherein the support member includes a second threaded portion in threaded engagement with a second body member and the support member is axially moveable by relative rotation between the support member and the second body member.

2. The brake actuating apparatus according to claim 1 wherein the piezo-electric device is attached to the abutment member.

3. The brake actuating apparatus according to claim 1 wherein at least one of the abutment member and the support member is rotatable by a rotation device.

4. The brake actuating apparatus according to claim 3 wherein the rotation device is an electric motor.

5. The brake actuating apparatus according to claim 1 wherein at least one of the first body member and the second body member is rotatable by a rotation device.

6. The brake actuating apparatus according to claim 3 wherein the rotation device is an electric motor.

7. The brake actuating apparatus according to claim 1 wherein, with the piezo-electric device in a contracted position, the support member supports the force transmission element for movement of the abutment member to an abutment member position wherein expansion of the piezo-electric device causes the piezo-electric device to abut the force transmission element, and the support member is moveable to a support member position wherein contraction of the piezo-electric device allows the force transmission element to abut the support member.

8. A method for actuating a brake comprising the steps of:
   moving an abutment member to abut a piezo-electric device against a force transmission element operable for transmitting a brake actuating force, wherein the abutment member is moveable to cause the piezo-electric device to selectively abut against and disengage from the force transmission element, wherein the abutment member includes a first threaded portion in engagement with a first body member, and the abutment member moves by relative rotation between the abutment member and the first body member;

expanding the piezo-electric device to apply a force between the abutment member and the force transmission element to move the force transmission element in a direction of brake actuation from a first position into a second position;

moving a support member independently of the abutment member into abutment with the force transmission element to support the force transmission element in the second position, wherein the support member includes a second threaded portion in engagement with a second body member, and the support member moves by relative rotation between the support member and the second body member and wherein the support member and the abutment member are co-axially arranged;

contracting the piezo-electric device;

repeating the step of moving the abutment member; and expanding the piezo-electric device to apply the force between the abutment member and the force transmission element to move the force transmission element in the direction of brake actuation from the second position to a third position.

9. The method for actuating a brake according to claim 9 further comprising the steps of:

moving the abutment member out of abutment with the force transmission element while the force transmission element is supported by the support member and the piezo-electric device is contracted;

expanding the piezo-electric device to abut the abutment member on the force transmission element;

moving the support member away from the force transmission element;

contracting the piezo-electric device to cause the support member to support the force transmission element; and repeating the steps of moving the abutment member, expanding the piezo-electric device, moving the support member, and contracting the piezo-element to release the brake.

* * * * *

UNITED STATES PATENT AND TRADEMARK OFFICE
CERTIFICATE OF CORRECTION

PATENT NO. : 7,070,026 B2  
APPLICATION NO. : 10/475754  
DATED : July 4, 2006  
INVENTOR(S) : Conti et al.

Page 1 of 1

It is certified that error appears in the above-identified patent and that said Letters Patent is hereby corrected as shown below:

On Title Page Item 75 Col. 1

(75) Inventors: "Robert Conti, Olgate (IT)" should be --Robert Conti, Olgiate (IT)--
"Dietmar Knoop, Mulheim Karlich (DE)" should be --Dietmar Knoop, Ebenhausen (DE)--

Claim 6, Column 4, line 48: "claim 3" should be --claim 5--

Claim 9, Column 6, line 4: "claim 9" should be --claim 8--

Signed and Sealed this

Fourteenth Day of November, 2006

JON W. DUDAS  
*Director of the United States Patent and Trademark Office*